US012265941B2

(12) United States Patent
Sui et al.

(10) Patent No.: US 12,265,941 B2
(45) Date of Patent: Apr. 1, 2025

(54) INVENTORY CHECKING APPARATUS, BACKEND APPARATUS, INVENTORY CHECKING MANAGEMENT SYSTEM, AND INVENTORY CHECKING METHOD

(71) Applicants: LINGDONG TECHNOLOGY (BEIJING) CO. LTD., Beijing (CN); DSC LOGISTICS (BEIJING) CO., LTD., Beijing (CN)

(72) Inventors: Liang Sui, Beijing (CN); Jiale Qian, Beijing (CN)

(73) Assignees: LINGDONG TECHNOLOGY (BEIJING) CO. LTD., Beijing (CN); DSC LOGISTICS (BEIJING) CO., LTD., Beijing (CN)

( * ) Notice: Subject to any disclaimer, the term of this patent is extended or adjusted under 35 U.S.C. 154(b) by 604 days.

(21) Appl. No.: 17/634,991

(22) PCT Filed: Aug. 13, 2020

(86) PCT No.: PCT/CN2020/108770
§ 371 (c)(1),
(2) Date: Feb. 13, 2022

(87) PCT Pub. No.: WO2021/031965
PCT Pub. Date: Feb. 25, 2021

(65) Prior Publication Data
US 2022/0292444 A1    Sep. 15, 2022

(30) Foreign Application Priority Data
Aug. 16, 2019    (CN) .......................... 201910758021.2

(51) Int. Cl.
*G06Q 10/087*    (2023.01)
*B65G 1/04*    (2006.01)
(Continued)

(52) U.S. Cl.
CPC ......... *G06Q 10/087* (2013.01); *B65G 1/0492* (2013.01); *B66F 9/0755* (2013.01);
(Continued)

(58) Field of Classification Search
CPC ................ G06Q 10/087; B65G 1/0492; B65G 2203/0241; B65G 2203/044;
(Continued)

(56) References Cited

U.S. PATENT DOCUMENTS

2011/0301757 A1    12/2011 Jones et al.
2017/0286901 A1*   10/2017 Skaff .................... G06V 10/751
(Continued)

FOREIGN PATENT DOCUMENTS

CN    202765672 U    3/2013
CN    106127379 A    11/2016
(Continued)

OTHER PUBLICATIONS

Office action of the corresponding JP Patent Application No. 2021-578005 (with English Summary) Issued on Feb. 7, 2023.
(Continued)

*Primary Examiner* — Thomas Randazzo
(74) *Attorney, Agent, or Firm* — NZ Carr Law Office (57) ABSTRACT

Disclosed are a checking apparatus, a backend apparatus, a checking management system, and a checking method. The checking apparatus comprises: a navigation trolley and a liftable checking module, wherein the liftable checking module is arranged on the navigation trolley, the liftable checking module moves under control of the navigation trolley so as to obtain, through the movement, depth information of an article pile to be checked, and the navigation trolley is used for determining side length information of the article pile based on the depth information, determining a checking result for the article pile based on the side length
(Continued)

information, and sending the checking result to the backend apparatus.

18 Claims, 7 Drawing Sheets

(51) Int. Cl.
    *B66F 7/06*        (2006.01)
    *B66F 9/075*      (2006.01)
    *G05D 1/00*       (2006.01)

(52) U.S. Cl.
    CPC ... *G05D 1/0094* (2013.01); *B65G 2203/0241* (2013.01); *B66F 7/0666* (2013.01)

(58) Field of Classification Search
    CPC .... B65G 1/1373; B66F 9/0755; B66F 7/0666; G05D 1/0094
    See application file for complete search history.

(56) References Cited

U.S. PATENT DOCUMENTS

| | | | | |
|---|---|---|---|---|
| 2018/0314261 | A1 | 11/2018 | Arandorenko et al. | |
| 2020/0172352 | A1* | 6/2020 | Elazary | B65G 59/02 |
| 2020/0238505 | A1* | 7/2020 | Parks, II | B25J 9/0027 |

FOREIGN PATENT DOCUMENTS

| | | | | | |
|---|---|---|---|---|---|
| CN | 205726130 | U | | 11/2016 | |
| CN | 106346495 | A | * | 1/2017 | ............. B25J 11/00 |
| CN | 106851108 | A | | 6/2017 | |
| CN | 106934579 | A | | 7/2017 | |
| CN | 107402052 | A | | 11/2017 | |
| CN | 206840101 | U | | 1/2018 | |
| CN | 109154993 | A | | 1/2019 | |
| CN | 109344928 | A | | 2/2019 | |
| CN | 109677824 | A | | 4/2019 | |
| CN | 110428209 | A | | 11/2019 | |
| JP | 2002293416 | A | | 10/2002 | |
| JP | 2008115003 | A | | 5/2008 | |
| JP | 2010-023950 | | | 2/2010 | |
| JP | 2016210586 | A | | 12/2016 | |
| JP | 2017-007861 | | | 1/2017 | |
| JP | 2018-513822 | | | 5/2018 | |
| JP | 2018115068 | A | | 7/2018 | |
| KR | 20170094103 | A | * | 8/2017 | ............. G06T 7/62 |
| WO | 2017175312 | | | 10/2017 | |
| WO | 2017175312 | A1 | | 10/2017 | |

OTHER PUBLICATIONS

First office action of the corresponding CN Patent Application No. 201910758021.2 (with English Summary) issued on Feb. 3, 2020.
Search report of the corresponding CN Patent Application No. 2019107580212 (with English Summary) searched on Jan. 15, 2020.
Second office action of the corresponding CN Patent Application No. 201910758021.2 (with English Summary) issued on Jun. 23, 2020.
Supplemental search report of the corresponding CN Patent Application No. 2019107580212 (with English Summary) searched on Jun. 16, 2020.
International search report of the corresponding PCT Application No. PCT/CN2020/108770 (with English Summary) dated Oct. 26, 2020.
Office action of the corresponding JP Patent Application No. 2021-578005 issued on Oct. 20, 2023 along with English translation thereof.
Office action of the corresponding JP Patent Application No. 2021-578005 issued on Mar. 21, 2024 along with English translation thereof.

* cited by examiner

INVENTORY CHECKING APPARATUS, BACKEND APPARATUS, INVENTORY CHECKING MANAGEMENT SYSTEM, AND INVENTORY CHECKING METHOD

This application claims the priority of a Chinese patent application filed in the China National Intellectual Property Administration on Aug. 16, 2019 with application number 201910758021.2, the entire contents of which are hereby incorporated by reference.

TECHNICAL FIELD

The disclosure relates to the technical field of article and goods management, for example, a checking apparatus, a backend apparatus, a checking management system, and a checking method.

BACKGROUND

Inventory checking is widely used in various fields, such as warehouse management or libraries. Timely and accurate checking may reduce the complexity of finding things, and also allows people to know the actual stock. Especially in the field of warehouse management, in order to learn the flow of goods (warehousing, IN-warehouse and EX-warehouse), it is necessary to check the actual quantity of articles in the warehouse periodically or temporarily, so as to know the inventory quantity exactly.

In the related art, checking is mostly conducted manually on site, which is time-consuming and labor-intensive. This method is characterized by long operation time and low work efficiency, and manual operation is error-prone, and rapid and batch checking is hardly realized. In the related art, articles are photographed, and checking may also be conducted by photos of articles. However, this checking method also requires manual work and is still low in work efficiency and error-prone. In the related art, RFID tags are arranged in each article, and checking may also be conducted by scanning RFID tags on the articles. But this method requires that RFID tags are arranged on each article, which is rather inconvenient.

SUMMARY

The disclosure provides a checking apparatus, a backend apparatus, a checking management system, and a checking method to solve the problem of manual on-site checking, so as to improve work efficiency, save both time and labor, increase the speed for determining checking result, make checking results more accurate, and avoid errors.

The embodiments of the invention provide a checking apparatus, which comprises a navigation trolley and a liftable checking module, wherein the navigation trolley comprises a processing device, and the liftable checking module is arranged on the navigation trolley;

the liftable checking module is configured to move under control of the navigation trolley so as to obtain, through the movement, depth information of an article pile to be checked, and the processing device is configured to determine side length information of the article pile based on the depth information, determine a checking result for the article pile based on the side length information, and send the checking result to a backend apparatus.

The embodiments of the invention also provide a backend apparatus.

The backend apparatus is configured to receive a checking result for an article pile sent from a checking apparatus and displaying the checking result through a display screen.

The embodiments of the invention also provide a checking management system, which comprises the checking apparatus provided by the embodiments of the invention and the backend apparatus provided by the embodiments of the invention.

The embodiments of the invention provide a checking method, which comprises the following steps:

moving a liftable checking module under control of a navigation trolley, and obtaining, through the movement, depth information of an article pile to be checked; and determining, by the navigation trolley, length information of each side of the article pile based on the depth information, determining a checking result for the article pile based on the length information of each side, and sending the checking result to a backend apparatus.

The embodiments of the invention provide a checking management method, which comprises the following steps:

moving a checking apparatus with a liftable checking module under control of a navigation trolley, and obtaining, by the checking apparatus and through the movement, depth information of an article pile to be checked;

determining, by the checking apparatus, length information of each side of the article pile based on the depth information through the navigation trolley, determining a checking result for the article pile based on the length information of each side, and sending the checking result to a backend apparatus; and receiving, by the backend apparatus, the checking result for the article pile sent from the checking apparatus and displaying the checking result through a display screen.

According to the technical solution provided by the embodiments of the invention, through the movement of the liftable checking module under control of the navigation trolley, more depth information of the article pile can be obtained, and more accurate checking result may be obtained based on the depth information Furthermore, because the checking result for the article pile may be obtained through the depth information, the speed for determining checking result is increased compared with the way of checking by taking photos of articles in the related art; compared with the way of obtaining a checking result by scanning RFID tags, the process is simplified and the cost is reduced due to there is no need to arrange RFID tag on each article; and by sending the checking result to the backend apparatus, an user may learn the checking result for the article pile through the backend apparatus, thus avoiding manual on-site checking, improving work efficiency and saving both time and labor.

DETAILED DESCRIPTION OF EMBODIMENTS

The disclosure will be described with reference to the drawings and embodiments below. The specific embodiments described here are only used to explain the disclosure, not to limit the disclosure. For convenience of description, only part of the structures related to the disclosure are shown in the drawings, but not all of them.

The technical terms such as rising, falling, left and right, or other positional terms mentioned in the embodiments of the invention are all based on a position of a checking apparatus when a liftable checking module is in a checking state.

Figure 1:
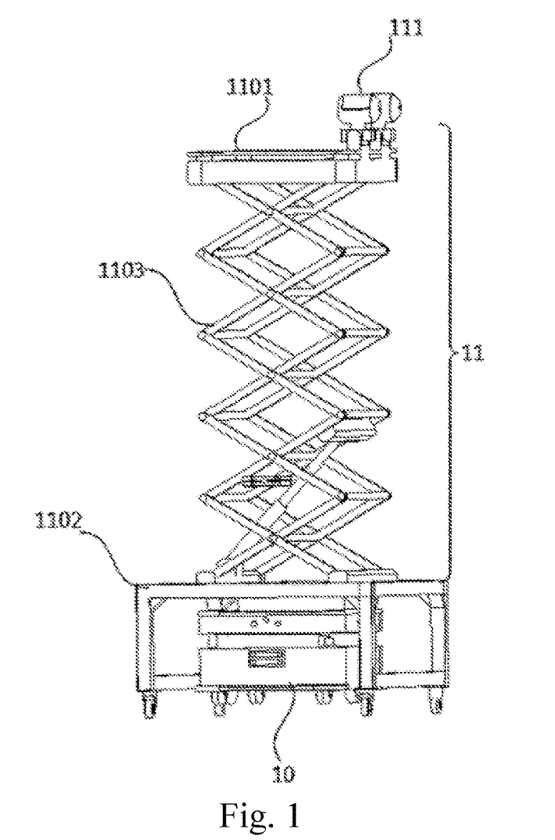
FIG. 1 is a structural diagram of a checking apparatus according to an embodiment of the invention.

FIG. 1 is a structural diagram of a checking apparatus according to an embodiment of the invention. The checking apparatus according to the embodiment of the invention may be applied to checking of one or more article piles in a large space, which may be a space with a volume larger than a set volume. Optionally, the checking apparatus according to the embodiment of the invention may be applied to checking of goods piles in warehouses, or the checking apparatus according to the embodiment of the invention may also be applied to checking of books, commodities and other items. A goods pile may or may not be on a shelf, and the goods pile may be formed by at least one piece of goods. Goods in the goods pile may be goods with packing boxes, or other goods conforming to shape rules, or goods with certain shapes.

The checking apparatus according to the embodiment of the invention is not limited to the above-mentioned application scenes, but may be applied to other checking scenes. The checking apparatus according to the embodiment of the invention may be applied to any checking scene.

As shown in FIG. 1, the checking apparatus according to the embodiment of the invention comprises a navigation trolley 10 and a liftable checking module 11, wherein the liftable checking module 11 is arranged on the navigation trolley 10. The liftable checking module 11 moves under control of the navigation trolley 10 so as to obtain, through the movement, depth information of an article pile to be checked. The navigation trolley 10 is used for determining side length information of the article pile based on the depth information, determining a checking result for the article pile based on the side length information, and sending the checking result to a backend apparatus.

The depth information refers to distance information from the article pile to be checked to the liftable checking module 11. The navigation trolley 10 and the liftable checking module 11 may be electrically connected in a wired way. The liftable checking module 11 may send the obtained depth information to a processing device of the navigation trolley 10. The navigation trolley 10 may control the liftable checking module 11 to move up and down through the processing device, and the navigation trolley 10 is controlled to move side to side so as to drive the liftable checking module 11 to move side to side. The liftable checking module 11 may obtain more accurate depth information of the article pile through up-and-down movement and side-to-side movement, and send the depth information to the processing device in the navigation trolley 10. The navigation trolley 10 may determine the side length information of the article pile based on the depth information through the processing device, determine a checking result for the article pile based on the side length information, and send the checking result to the backend apparatus.

The checking result may be the number of articles in the article pile, or other information. Optionally, the backend apparatus may comprise a remote management apparatus, a cloud apparatus and a smart terminal. The smart terminal may be a smart phone, a tablet computer, etc. By sending the checking result to the backend apparatus, a user can learn the information such as the number of articles in the article pile through the backend apparatus, which facilitates statistics work for the user, and the user does not need to do checking on site, which is more convenient.

According to the technical solution provided by the embodiments of the invention, through the movement of the liftable checking module under control of the navigation trolley, more depth information of the article pile may be obtained, and more accurate checking result may be obtained based on the depth information. Furthermore, because the checking result for the article pile may be obtained through the depth information, the speed for determining checking result is increased compared with the way of checking by taking photos of articles in the related art; compared with the way of obtaining a checking result by scanning RFID tags, the process is simplified and the cost is reduced due to there is no need to arrange RFID tag on each article; and by sending the checking result to the backend apparatus, an user may learn the checking result for the article pile through the backend apparatus, thus avoiding manual on-site checking, improving work efficiency and saving both time and labor.

Optionally, in the following example, the checking apparatus according to the embodiment of the invention is a warehouse logistics vehicle with a checking function, and the article pile is a goods pile in a warehouse.

In an implementation mode of the embodiment of the invention, optionally, as shown in FIG. 1, the liftable checking module 11 comprises a lifting device and a depth sensor 111, and the depth sensor 111 is arranged on the lifting device arranged on the navigation trolley 10. Optionally, the lifting device is a scissor-type lifting platform, the depth sensor 111 is arranged on the scissor-type lifting platform, and the scissor-type lifting platform is arranged on the navigation trolley 10. The scissor-type lifting platform may comprise a platform 1101, a base 1102 and a scissor structure 1103, and the depth sensor 111 is arranged on the platform 1101. The scissor-type lifting platform may be a hydraulic scissor-type lifting platform, and the scissor-type lifting platform may be replaced by other lifting devices. Optionally, the manufacturing cost may be reduced by adopting the scissor-type lifting platform, and the movement of the platform is easily controlled, so that the up-and-down movement of the depth sensor 111 can be easily controlled. Optionally, the depth sensor 111 may be an RGBD camera and a distance sensor, and the distance sensor may be a laser distance sensor (such as lidar), an ultrasonic distance sensor, or an infrared distance sensor, etc.

In an implementation mode of the embodiment of the invention, optionally, as shown in FIG. 1, the liftable checking module 11 is detachable. That is, the liftable checking module 11 may be separated from the navigation trolley 10. When the liftable checking module 11 is separated from the navigation trolley 10, the navigation trolley 10 is able to carry goods, and the goods may be automatically transported to a designated position to realize the loading function.

Figure 2:
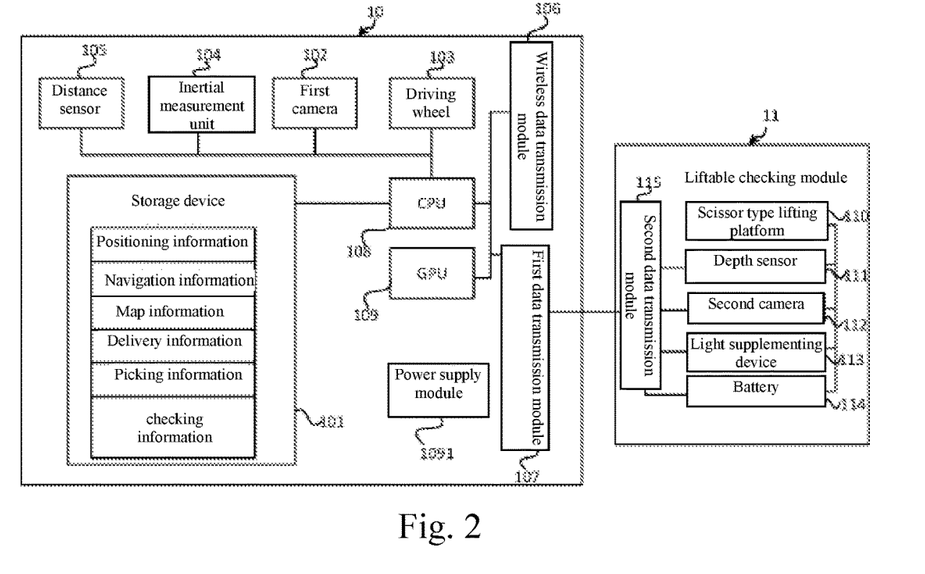
FIG. 2 is a structural block diagram of a checking apparatus according to an embodiment of the invention.

FIG. 2 is a structural block diagram of a checking apparatus according to an embodiment of the invention. As shown in FIG. 2, in addition to a processing device, the navigation trolley 10 may comprise a storage device 101, a first camera 102, a driving wheel 103, an inertial measurement unit 104, a distance sensor 105, a first data transmission module 107 and a wireless data transmission module 106. The processing device may comprise a central processing unit (CPU) 108 and a graphics processing unit (GPU) 109. The first camera 102 may be used for obtaining identification information of a shelf where the goods pile is located and transmitting the identification information to the processing device. The distance sensor 105 may be used for determining a distance between the goods pile and the navigation trolley 10. The processing device may also be used for matching the identification information with stored map information, taking matched position information as positioning information of the shelf and the goods pile, and determining positioning information of the navigation trolley 10 based on the positioning information of the goods pile and the distance between the goods pile and the navigation trolley, so that the navigation trolley 10 can determine its own position.

As shown in FIG. 2, the inertial measurement unit 104 is used for measuring the motion parameters of the navigation trolley when moving on the ground, so that the processing device can determine the data such as a moving distance on the ground and a direction angle according to the motion parameters. The processing device can also perform operations such as repositioning based on the positioning information, the moving distance and the direction angle. When the navigation trolley 10 needs to drive the liftable checking module 11 to move side to side, the navigation trolley 10 may control the driving wheel 103 to move through the processing device, so as to drive the liftable checking module 11 to move side to side. By means of the movement parameters measured by the inertial measurement unit 104, a side-to-side movement distance and a direction angle of the liftable checking module 104 may be determined, and the processing device controls the navigation trolley 10 to move according to the side-to-side movement distance and the direction angle.

The storage device 101 may be used for storing information, such as the positioning information of the navigation trolley, navigation information, warehouse map information, delivery information, picking information and checking information. The checking information may include the size of a shelf, the size of each piece of goods, checking task information, etc. The first data transmission module 107 may be used for data communication between the navigation trolley 10 and the liftable checking module 11. The wireless data transmission module 106 may be used for data communication between the navigation trolley 10 and the backend apparatus. On the basis of the above embodiments, the navigation trolley 10 may further comprise a power supply module 1091, and the power supply module 1091 may be electrically connected with each module in the navigation trolley (the electrical connection relationship is not shown in FIG. 2) to supply power to each module in the navigation trolley 10.

As shown in FIG. 2, in addition to the scissor-type lifting platform 110 and the depth sensor 111, the liftable checking module 11 may also comprise a second camera 112, a light supplementing device 113, a battery 114 and a second data transmission module 115. The light supplementing device 113 may be a fill-in light, and the battery 114 may supply power to each module in the liftable checking module 11, or when the power supply module 1091 in the navigation trolley 10 is insufficient to supply power to each module in the liftable checking module 11, the battery 114 may supply power to each module in the liftable checking module 11.

In the embodiment of the invention, the liftable checking module 11 may perform data communication with the navigation trolley 10 through the second data transmission module 115, and the second camera 112 may acquire a picture or video of the goods pile. The light supplementing device 113 may be used for supplementing light for the second camera 112 when the brightness of external ambient light is lower than a set value. The brightness of the external ambient light may be judged by the picture or video of the goods piles taken by the second camera 112, or the brightness of the external ambient light may also be detected by an ambient light sensor. When the brightness of the external ambient light is lower than the set value, the light supplementing device 113 supplements light for the second camera 112.

In the embodiment of the invention, when the article pile is a goods pile in a warehouse, a checking method using the above-mentioned checking apparatus may be as follows. The liftable checking module obtains a first distance between a side, close to the liftable checking module, of a shelf where the goods pile is located and the liftable checking module, and determines a second distance between a side, away from the liftable checking module, of the shelf and the liftable checking module based on the first distance and the size of the shelf; moves up and down under control of the navigation trolley, and obtains a distance between goods in the goods pile and the liftable checking module during the up-and-down movement; and moves side to side under driving of the navigation trolley, and obtains a distance between the goods in the goods pile and the liftable checking module during the side-to-side movement. The navigation trolley determines side lengths of height boundary lines of the goods pile based on the distance between goods in the goods pile and the liftable checking module obtained by the liftable checking module during the up-and-down movement; determines side lengths of width boundary lines of the goods pile based on the distance between goods in the goods pile and the liftable checking module obtained by the liftable checking module during the side-to-side movement; determines side lengths of thickness boundary lines of the goods pile based on the distance between the side, away from the liftable checking module, of the shelf and the liftable checking module and the distance between the goods and the liftable checking module; and determines quantity information of the goods in the goods pile based on the side lengths of the height, width and thickness boundary lines, and sends the quantity information to the backend apparatus.

Figure 3:
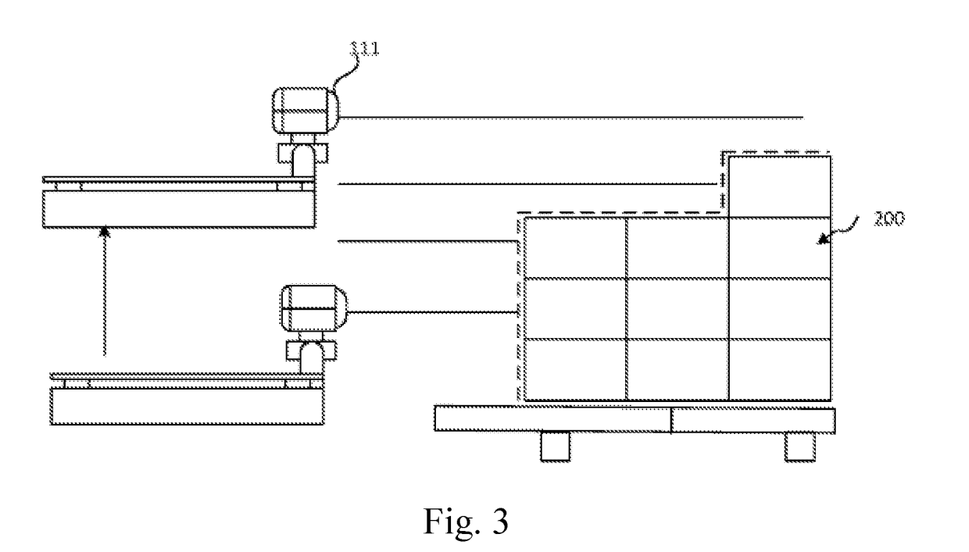
FIG. 3 is a diagram showing the measurement of a side length of a goods pile using a checking apparatus according to an embodiment of the invention.

The navigation trolley controls the liftable checking module to move up and down through the processing device. As shown in FIG. 3, the navigation trolley controls the depth sensor 111 to move up and down through the processing device, obtains a distance between the goods in the goods pile 200 and the depth sensor 111 in the liftable checking module during the up-and-down movement, and sends distance information to the processing device in the navigation trolley. Through the processing device, the navigation trolley can determine the height boundary lines (the height boundary lines are shown by dotted lines in FIG. 3) and the side lengths of the height boundary lines. For example, when the depth sensor 111 is an RGBD camera, a depth image of the goods pile 200 may be obtained by the RGBD camera, and the distance between the goods in the goods pile 200 and the liftable checking module may be determined by means of the depth image of the goods pile 200, so that the height boundary lines of the goods pile 200 may be determined according to the distance. By controlling the liftable checking module to move up and down, a plurality of depth images may be obtained, and the side lengths of the height boundary lines of the goods pile may be obtained more accurately by comparing the plurality of depth images. If the depth sensor 111 is a distance sensor, the processing device in the navigation trolley controls the liftable checking module to move up and down, the distance between the goods in the goods pile 200 and the liftable checking module may be obtained by the distance sensor, the height boundary lines may be determined according to the distance, and the side lengths of the height boundary lines may be obtained by means of the information such as an up-and-down movement distance of the liftable checking module and a detection angle of the distance sensor. One may also refer to the description of related arts for a method for determining the side lengths of the height boundary lines based on the distance between the goods in the goods pile 200 and the depth sensor.

Figure 4:
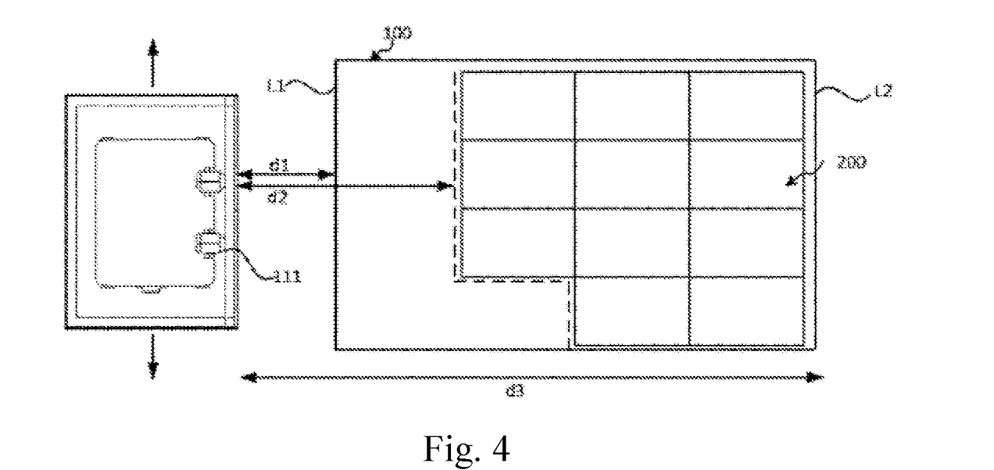
FIG. 4 is a diagram showing the measurement of a side length of a goods pile using a checking apparatus according to an embodiment of the invention.

As shown in FIG. 4, the navigation trolley may drive the liftable checking module to move side to side (the single-direction straight arrow in FIG. 4 may indicate the moving direction of the liftable checking module driven by the navigation trolley). By controlling the driving wheel to move side to side on the ground, the navigation trolley drives the liftable checking module to move side to side, so that the depth sensor 111 in the liftable checking module may obtain the distance between the goods in the goods pile 200 and the liftable checking module during the side-to-side movement. Based on the distance, the processing device of the navigation trolley may determine the width boundary lines (the width boundary lines may be represented by dotted lines in FIG. 4) and the side lengths of the width boundary lines. A method for determining the side lengths of the width boundary lines may be the same as the principle for determining the side lengths of the height boundary lines during the up-and-down movement of the liftable checking module, and will not be repeated.

When the goods pile is on a shelf, the navigation trolley may distinguish the shelf from goods according to the depth information obtained by the liftable checking module during the up-and-down movement and the side-to-side movement. For example, determination may be based on the depth information, and if a detected object has gaps with equal intervals, it may be determined that the detected object is a shelf.

As shown in FIG. 4, the side, close to the liftable checking module, of the shelf 100 where the goods pile is located is L1, and the side, away from the liftable checking module, of the shelf 100 is L2. The liftable checking module may obtain the distance d1 between the liftable checking module and L1 or determine the distance d2 between the goods in the goods pile 200 and the liftable checking module through the depth sensor 111, and the measured distance information is sent to the processing device in the navigation trolley by the depth sensor 111. Based on the distance (d1) between the liftable checking module and L1 and a side length of the shelf, the navigation trolley may determine that the distance between the liftable checking module and L2 is d3 through the processing device, wherein the side length of the shelf is generally input in advance through a display screen of the backend apparatus, or may also be measured by the depth sensor 111. According to the distance (d3) between the liftable checking module and L2 and the distance (d2) between the goods in the goods pile 200 and the liftable checking module, the navigation trolley may obtain the side length (d3−d2) of the thickness boundary line of the goods pile through the processing device.

Figure 5A:
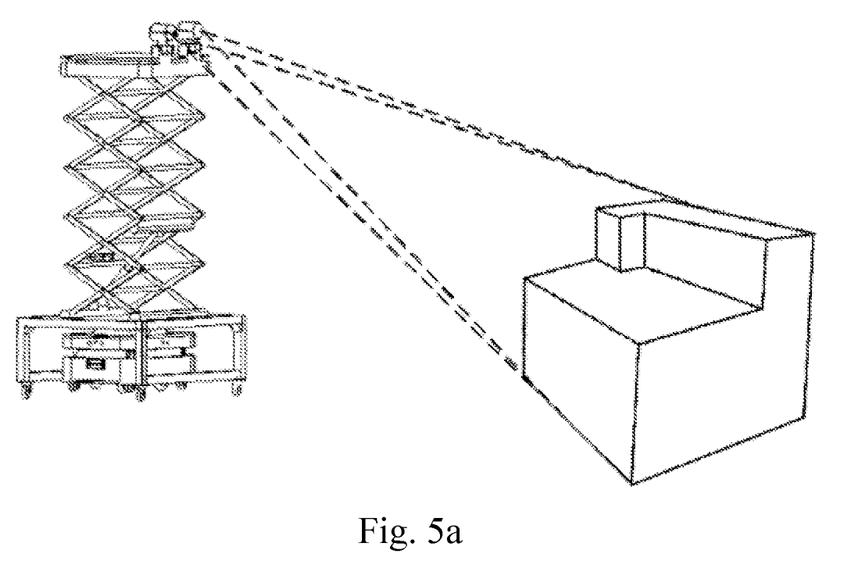
FIG. 5a is a state diagram of a checking apparatus according to an embodiment of the invention during checking goods.
Figure 5B:
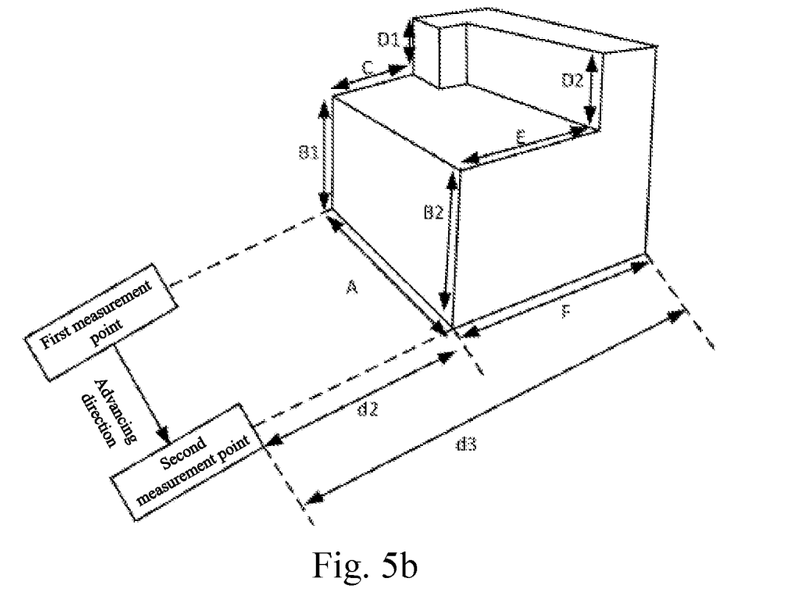
FIG. 5b is a diagram of a goods pile according to an embodiment of the invention.

Through the above method, the liftable checking module may be controlled to move to realize checking (refer to FIG. 5a for the diagram of checking). Side lengths A-F of the goods pile shown in FIG. 5b may be calculated by the above method, and the quantity of the goods may be determined based on the above side lengths and a size of the goods, and the quantity information is sent to the backend apparatus. In one implementation mode, firstly, the navigation trolley advances to a first measurement point, and the liftable checking module 11 stays at a lowest point of possible descending height during the advancing (so that when the navigation trolley moves in a non-checking mode, the center of gravity is the lowest, the movement is the most stable and the navigation trolley will not tip over). After the navigation trolley reaches the first measurement point, the liftable checking module 11 measures the size of the goods from bottom to top, and the depth sensor 111 may determine side lengths B1, C and D1 during the ascending process at the first measurement point. Then, the navigation trolley moves forward from the first measurement point along one side of the goods pile, and measures the side length A while moving forward. When the depth sensor 111 senses that there is a large drop in a depth direction (or greater than a drop threshold, as shown in FIG. 5b where a depth sensing result is changed from d2 to d3), the navigation trolley stops moving, and the current position is set as a second measurement point. After the navigation trolley arrives at the second measurement point, the liftable checking module 11 moves up and down to measure the size of the goods pile, and the depth sensor 111 may determine side lengths B2, E and D2 during the up-and-down movement at the second measurement point. Finally, if there is a physical boundary (such as a wall) behind the goods pile, the navigation trolley may obtain the side length F by moving forward along the side of the goods again (d3 minus d2). If there is no physical boundary behind the goods pile, the navigation trolley turns so that the depth sensor 111 faces the side F, and measurement is conducted again according to the above steps. The size information of the goods (length, width and height information) and the size information of the shelf may be pre-stored in the storage device of the navigation trolley, or may be obtained by the checking apparatus from a warehouse management system in the backend apparatus through the navigation trolley. Optionally, the warehouse management system may be configured in the backend apparatus. Through the warehouse management system, the user may check the checking result.

Figure 6:
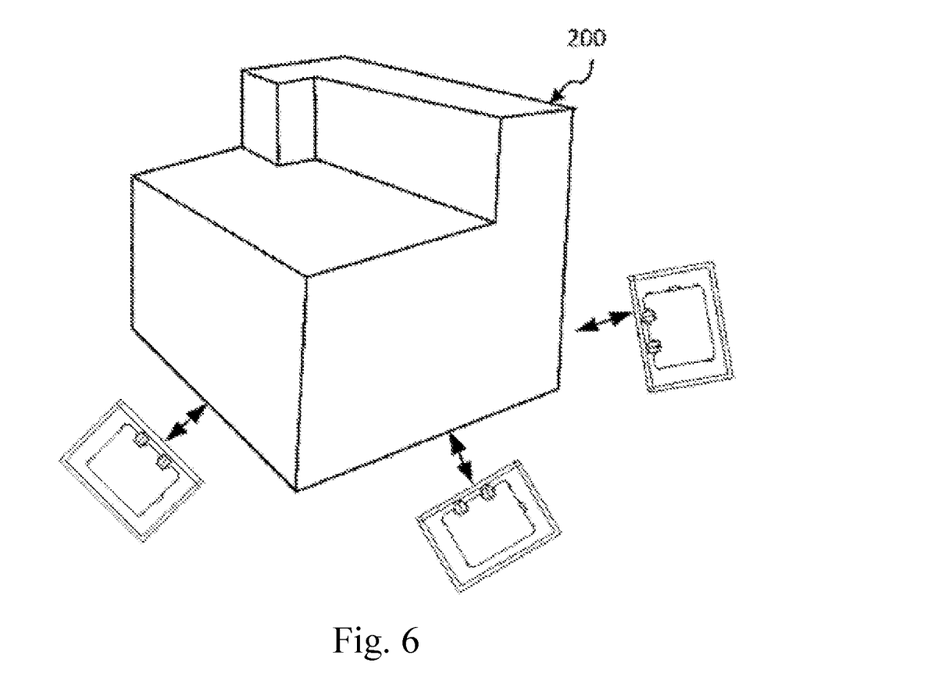
FIG. 6 is a diagram of a navigation trolley driving a liftable checking module to move around a goods pile according to an embodiment of the invention.

In one implementation mode of the embodiment of the invention, optionally, the navigation trolley may also be used for driving the liftable checking module to move around the goods pile when it is determined that the depth information of the goods pile is insufficient, so as to obtain depth information of the goods pile from other angles. When the navigation trolley determines through the processing device that the depth information of the goods pile is only the depth information of a single side of the goods pile, or determines that there is a gap between the goods in the goods pile through the depth information, or cannot determine the side length information of the goods pile through the depth information, the navigation trolley plans a navigation path around the goods pile based on its own positioning information and the positioning information of the goods pile, and drives the liftable checking module to move around the goods pile based on the navigation path to obtain the depth information of the goods pile from other angles. Refer to FIG. 6 for the diagram of the navigation trolley driving the liftable checking module to move around the goods pile. One may refer to the methods in related arts for a navigation path planning method, and refer to the methods in related arts for a movement method based on a navigation path.

As shown in FIG. 2, the navigation trolley 10 may obtain, through the first camera 102, identification information of the shelf where the goods pile is located, and determine the distance between the goods pile and the navigation trolley 10 through the distance sensor 105; and the navigation trolley 10 may further match the identification information with the stored map information, take the matched position information as the positioning information of the shelf and the goods pile, and determine the positioning information of the navigation trolley 10 based on the positioning information of the goods pile and the distance between the goods pile and the navigation trolley. The navigation trolley 10 determines the navigation path according to its own positioning information and the positioning information of the goods pile, and drives the liftable checking module 11 to move around the goods pile based on the navigation path. In the course of navigation, the navigation trolley 10 may control the moving direction and other parameters based on the motion parameters acquired by the inertial measurement unit 104, so as to realize the movement along the navigation path, thus realizing the movement around the goods. When the navigation trolley moves around the goods pile, a self-positioning method may also be indoor positioning methods in other related arts, which is not limited.

In one implementation mode of the embodiment of the invention, as shown in FIG. 2, the liftable checking module 11 acquires a picture or video of the goods pile through the second camera 112, and transmits the picture or video to the navigation trolley 10. The navigation trolley 10 is also used for sending the picture or video of the goods pile to the backend apparatus when it is determined that the navigation path is blocked by an obstacle, so that the backend apparatus can display the picture or video through the display screen. The navigation trolley may determine whether there is an obstacle on the navigation path through the distance sensor 105. When the navigation path is blocked by an obstacle, the picture or video of the goods pile taken by the second camera 112 may be sent to the backend apparatus to be displayed to the user through the backend apparatus. Alternatively, when the navigation trolley determines that the current navigation path is blocked, the navigation trolley may automatically plan other navigation paths to move around the goods pile.

In one implementation mode of the embodiment of the invention, optionally, as shown in FIG. 2, the checking apparatus according to the embodiment of the invention may also be used for receiving an operation mode switching instruction sent from the backend apparatus through the navigation trolley 10, and switching an operation mode according to the switching instruction, wherein the switching instruction includes an instruction to switch from a checking mode to a loading mode or an instruction to switch from a loading mode to a checking mode. The user may trigger the switching instruction to control the operation mode of the checking apparatus as needed. The checking apparatus receives the operation mode switching instruction sent from the backend apparatus through the navigation trolley 10, and switches the operation mode according to the switching instruction. Optionally, when the checking apparatus switches the operation mode from a checking mode to a loading mode through the navigation trolley 10, checking for the goods pile is stopped.

Thus, the checking apparatus switches the operation mode by responding to the operation mode switching instruction, which meets the needs of the user, brings convenience to the user and realizes the checking/loading function of the checking apparatus.

Figure 7:
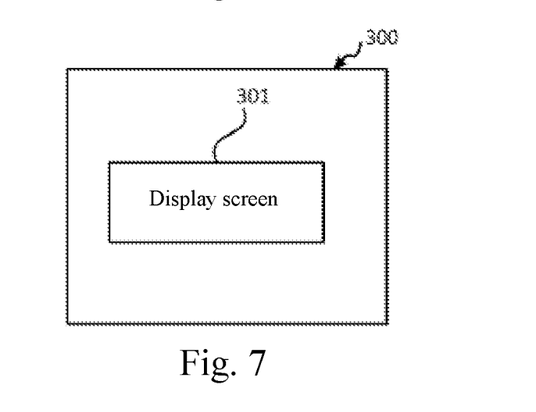
FIG. 7 is a structural diagram of a backend apparatus according to an embodiment of the invention.

FIG. 7 is a structural diagram of a backend apparatus according to an embodiment of the invention. The backend apparatus according to the embodiment of the invention may be applied to the same scene as the checking apparatus according to an embodiment of the invention. As shown in FIG. 7, the backend apparatus 300 is used for receiving a checking result for an article pile sent from a checking apparatus and displaying the checking result through a display screen 301. Optionally, the backend apparatus comprises a remote management apparatus, a cloud apparatus or a smart terminal. The remote management apparatus may comprise a server and a display screen.

The structure of the backend apparatus shown in FIG. 7 is only a schematic structure, and the structure of the backend apparatus is not limited to what is shown in FIG. 7.

Figure 8:
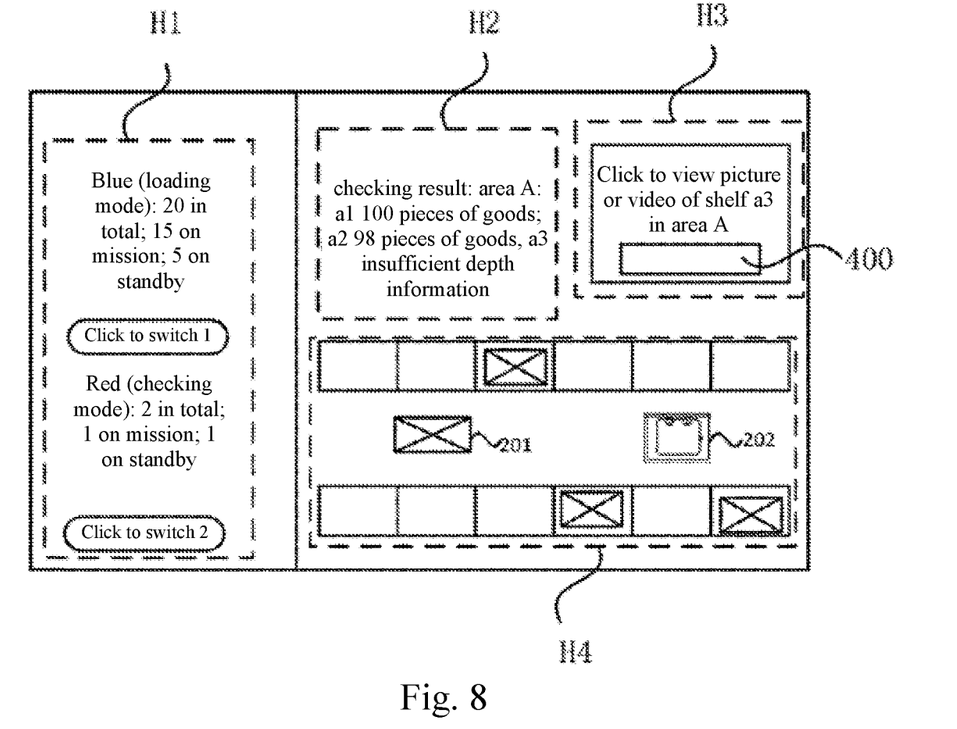
FIG. 8 is a diagram of a display interface of a backend apparatus according to an embodiment of the invention.

In one implementation mode of the embodiment of the invention, optionally, the backend apparatus is further used for receiving an operation mode switching instruction and sending the operation mode switching instruction to a checking apparatus, so that the checking apparatus can switch the operation mode. The backend apparatus may also monitor and control a plurality of checking apparatuses. The backend apparatus may display a control for controlling the checking apparatus to switch the operation mode. When the user triggers the control, the operation mode switching instruction may be sent to the checking apparatus, so that the checking apparatus can switch the operation mode. The backend apparatus may also display checking results of each checking apparatus, a picture or video sent from the checking apparatuses, and the operation modes of each checking apparatus. The display information of the backend apparatus can be referred to FIG. 8. As shown in FIG. 8, the backend apparatus may display information of the checking apparatus in the checking mode and information of the checking apparatus in the loading mode. For example, a left area H1 is an information summary and mode conversion area of the loading mode and the checking mode of the navigation trolley. In this area, real-time quantity and status information of the navigation trolleys in the loading mode and the checking mode will be displayed. In addition, conversion between the loading mode and the checking mode of the navigation trolley may also be carried out in this area. Taking FIG. 8 as an example, in the left area H1 of this embodiment, there are two checking apparatuses in the checking mode, one of which is performing the checking task and the other is on standby, and there are 20 checking apparatuses in the loading mode in the area H1, 15 of which are performing the loading task and 5 are on standby. Two controls are also displayed in the area H1, namely "Click to switch 1" and "Click to switch 2", and the two controls are used for switching the operation mode of the checking apparatus. As shown in FIG. 8, the backend apparatus also has a checking result display area H2, that is, the backend apparatus may also display a checking result of the checking apparatus. If checking is successful, the quantity of goods will be displayed directly; and if checking is unsuccessful, an error message will be displayed, including the reasons for unsuccessful checking. For example, in FIG. 8, an upper middle area H2 of this embodiment shows the checking result of an area A: 100 pieces of goods are on a shelf a1; 98 pieces of goods are on a shelf a2, and depth information of a shelf a3 is insufficient, wherein a1, a2 and a3 may be shelf identifiers respectively. As shown in FIG. 8, the backend apparatus also has a checking picture or video display area H3 (at the upper right in this embodiment), that is, the backend apparatus may also display a picture or video 400 collected by the checking apparatus in the checking process. In one embodiment, the area H3 displays a picture or video of a goods pile for which checking fails due to insufficient depth information. As shown in FIG. 8, the backend apparatus also has a real-time work map display area H4, that is, the backend apparatus may display current real-time position information of the navigation trolley, and the backend apparatus may indicate the navigation trolley is currently in the loading mode or the checking mode. Taking FIG. 8 as an example, a real-time work map and the positions of each navigation trolley are displayed in a lower right area H4 in this embodiment, wherein 201 represents the navigation trolley in the loading mode and 202 represents the navigation trolley in the checking mode, and different colors or shapes may be used to distinguish the navigation trolleys in the loading mode and in the checking mode. The way that the backend apparatus displays information is not limited to the above-mentioned forms, but may be in other forms, such as changing the location of the areas, or displaying the information of each area by pages.

By receiving and displaying the checking result, the backend apparatus according to the embodiment of the invention facilitates the user to learn the checking result for the article pile, avoids manual on-site checking, improves work efficiency and saves both time and labor.

Figure 9:
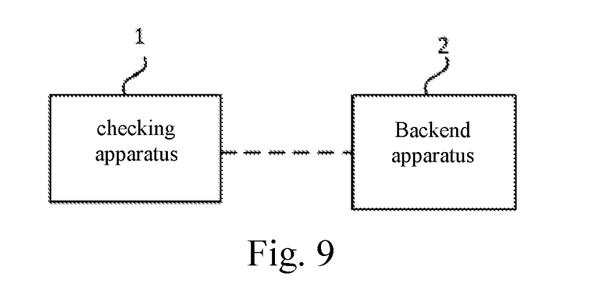
FIG. 9 is a structural diagram of a checking management system according to an embodiment of the invention.
Figure 10:
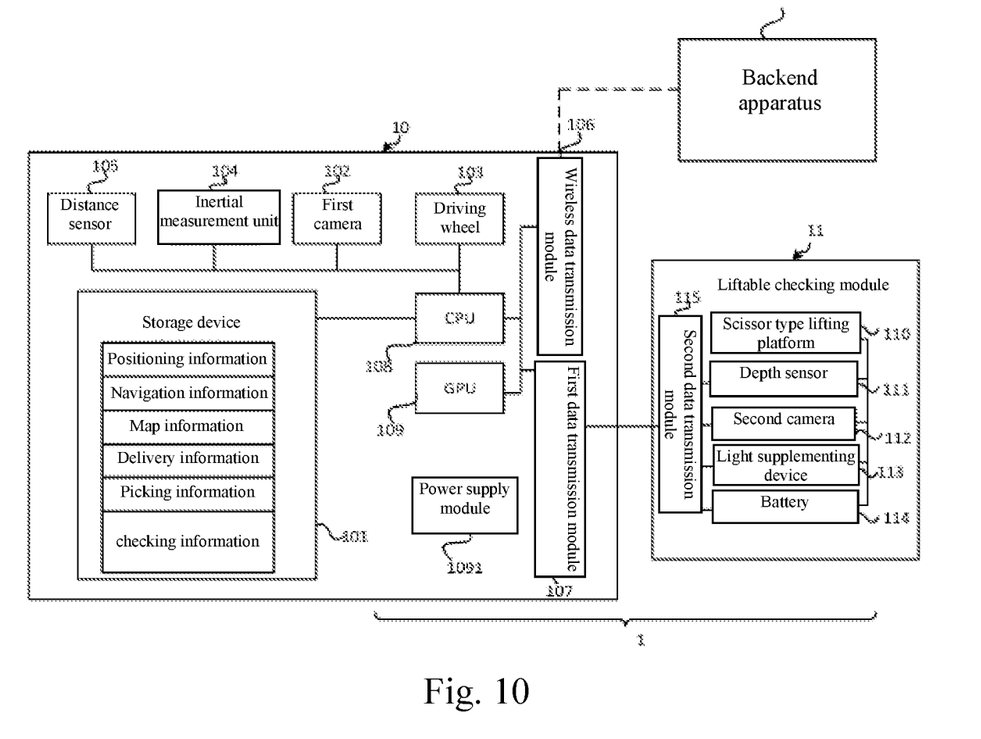
FIG. 10 is a structural diagram of a checking management system according to an embodiment of the invention.

FIGS. 9 and 10 are structural diagrams of a checking management system according to an embodiment of the invention. As shown in FIGS. 9 and 10, the checking management system according to the embodiment of the invention may comprise the checking apparatus 1 according to an embodiment of the invention and the backend apparatus 2 according to an embodiment of the invention. the description of the checking apparatus and the backend apparatus can be referred to the above embodiments.

Figure 11:
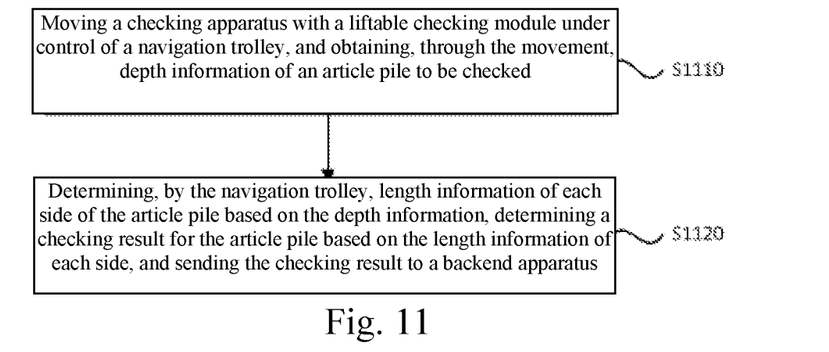
FIG. 11 is a flowchart of a checking method according to an embodiment of the invention.

FIG. 11 is a flowchart of a checking method according to an embodiment of the invention, which is realized by the checking apparatus according to an embodiment of the invention. As shown in FIG. 11, the technical solution according to the embodiment of the invention comprises:

S1110, moving a liftable checking module under control of a navigation trolley, and obtaining, through the movement, depth information of an article pile to be checked; and S1120, determining, by the navigation trolley, length information of each side of the article pile based on the depth information, determining a checking result for the article pile based on the length information of each side, and sending the checking result to a backend apparatus.

For the introduction of each step in the embodiment of the invention, please refer to the related description of the above embodiments, which will not be repeated.

According to the technical solution provided by the embodiments of the invention, through the movement of the liftable checking module under control of the navigation trolley, more depth information of the article pile may be obtained, and more accurate checking result may be obtained based on the depth information. Furthermore, because the checking result for the article pile may be obtained through the depth information, the speed for determining checking result is increased compared with the way of checking by taking photos of articles in the related art; compared with the way of obtaining a checking result by scanning RFID tags, the process is simplified and the cost is reduced due to there is no need to arrange RFID tag on each article; and by sending the checking result to the backend apparatus, an user may learn the checking result for the article pile through the backend apparatus, thus avoiding manual on-site checking, improving work efficiency and saving both time and labor.

Figure 12:
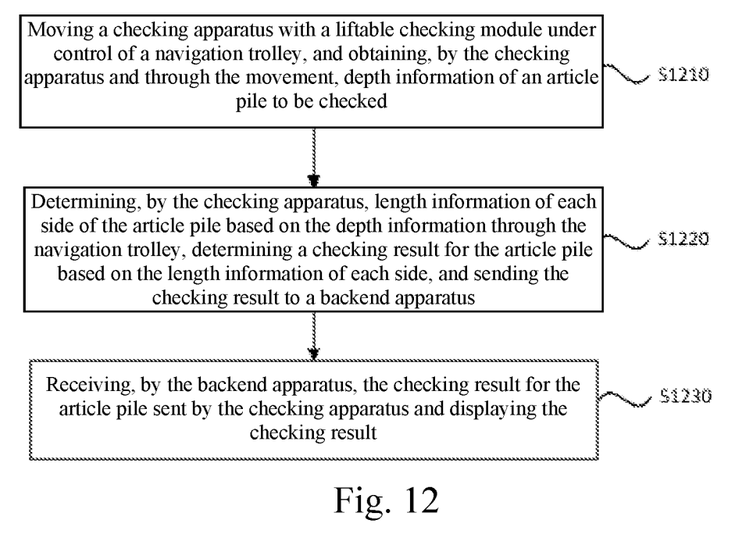
FIG. 12 is a flowchart of a checking management method according to an embodiment of the invention.

FIG. 12 is a flowchart of a checking management method according to an embodiment of the invention, which is implemented by the checking management system according to an embodiment of the invention. As shown in FIG. 12, the technical solution according to the embodiment of the invention comprises:

S1210, moving a checking apparatus with a liftable checking module under control of a navigation trolley, and obtaining, by the checking apparatus and through the movement, depth information of an article pile to be checked;

S1220, determining, by the checking apparatus, length information of each side of the article pile based on the depth information through the navigation trolley, determining a checking result for the article pile based on the length information of each side, and sending the checking result to a backend apparatus; and S1230, receiving, by the backend apparatus, the checking result for the article pile sent from the checking apparatus and displaying the checking result.

The introduction of each step in the embodiment of the invention can be referred to the related description of the above embodiments, which will not be repeated.

According to the technical solution provided by the embodiments of the invention, through the movement of the liftable checking module under control of the navigation trolley, more depth information of the article pile may be obtained, and more accurate checking result may be obtained based on the depth information Furthermore, because the checking result for the article pile may be obtained through the depth information, the speed for determining checking result is increased compared with the way of checking by taking photos of articles in the related art; compared with the way of obtaining a checking result by scanning RFID tags, the process is simplified and the cost is reduced due to there is no need to arrange RFID tag on each article; and by sending the checking result to the backend apparatus, an user may learn the checking result for the article pile through the backend apparatus, thus avoiding manual on-site checking, improving work efficiency and saving both time and labor.

What is claimed is:
1. A checking apparatus, comprising:
a navigation trolley, wherein the navigation trolley comprises a processing device; and
a liftable checking module, wherein the liftable checking module is arranged on the navigation trolley, the liftable checking module is configured to move under control of the navigation trolley so as to obtain, through the movement, depth information of an article pile to be checked, and the processing device is configured to determine side length information of the article pile based on the depth information, determine a checking result for the article pile based on the side length information, and send the checking result to a backend apparatus;

the checking apparatus is further configured to receive an operation mode switching instruction sent from the backend apparatus through the navigation trolley, and switch an operation mode according to the switching instruction, and wherein the switching instruction comprises an instruction to switch from a checking mode to a loading mode or an instruction to switch from a loading mode to a checking mode.

2. The apparatus according to claim 1, wherein the checking apparatus is further configured to stop checking for the goods pile when the operation mode is switched from the checking mode to the loading mode through the navigation trolley.

3. The apparatus according to claim 1, wherein the checking apparatus is a warehouse logistics vehicle with a checking function, and the article pile is a goods pile in a warehouse.

4. The apparatus according to claim 3, wherein the liftable checking module is detachable.

5. The apparatus according to claim 3, wherein
the liftable checking module is further configured to acquire a picture or video of the goods pile through a second camera; and
the navigation trolley is further configured to send the picture or video of the goods pile to the backend apparatus when a navigation path is blocked by an obstacle, so that the backend apparatus can display the picture or video through a display screen.

6. The apparatus according to claim 3, wherein
the liftable checking module is configured to obtain a first distance between a side, adjacent to the liftable checking module, of a shelf where the goods pile is located and the liftable checking module, and determine a second distance between a side, away from the liftable checking module, of the shelf and the liftable checking module based on the first distance and a size of the shelf;
the liftable checking module is configured to move up and down under control of the navigation trolley, obtain a distance between goods in the goods pile and the liftable checking module during the up-and-down movement, move side to side under driving of the navigation trolley, and obtain a distance between the goods in the goods pile and the liftable checking module during the side-to-side movement; and
the navigation trolley is configured to determine side lengths of height boundary lines of the goods pile based on the distance between the goods in the goods pile and the liftable checking module obtained by the liftable checking module during the up-and-down movement, determine side lengths of width boundary lines of the goods pile based on the distance between the goods in the goods pile and the liftable checking module obtained by the liftable checking module during the side-to-side movement, determine side lengths of thickness boundary lines of the goods pile based on the distance between the side, away from the liftable checking module, of the shelf and the liftable checking module and the distance between the goods and the liftable checking module, determine quantity information of the goods in the goods pile based on the side lengths of the height, width and thickness boundary lines, and send the quantity information to the backend apparatus.

7. The apparatus according to claim 3, wherein the navigation trolley is further configured to drive the liftable checking module to move around the goods pile when the navigation trolley determines through the processing device that the depth information of the goods pile is only the depth information of a single side of the goods pile, or determines that there is a gap between the goods in the goods pile through the depth information, or cannot determine the side length information of the goods pile through the depth information, so as to obtain depth information of the goods pile from other angles.

8. The apparatus according to claim 7, wherein
the navigation trolley is further configured to plan a navigation path around the goods pile based on its own positioning information and positioning information of the goods pile when the navigation trolley determines through the processing device that the depth information of the goods pile is only the depth information of a single side of the goods pile, or determines that there is a gap between the goods in the goods pile through the depth information, or cannot determine the side length information of the goods pile through the depth information, and drive the liftable checking module to move around the goods pile based on the navigation path.

9. The apparatus according to claim 8, wherein
the navigation trolley is further configured to obtain, through a first camera, identification information of a shelf where the goods pile is located, and determine a distance between the goods pile and the navigation trolley through a distance sensor; and
the navigation trolley is further configured to match the identification information with stored map information, take matched position information as positioning information of the shelf and the goods pile, and determine positioning information of the navigation trolley based on the positioning information of the goods pile and the distance between the goods pile and the navigation trolley.

10. The apparatus according to claim 3, wherein the liftable checking module comprises a lifting device and a depth sensor, and the depth sensor is arranged on the lifting device arranged on the navigation trolley.

11. The apparatus according to claim 10, wherein the lifting device comprises a scissor-type lifting platform.

12. The apparatus according to claim 10, wherein the depth sensor comprises a lidar, an RGBD camera, an infrared distance sensor or an ultrasonic distance sensor.

13. The apparatus according to claim 10, wherein the liftable checking module is configured to stay at a lowest descending height, when the navigation trolley moves in a non-checking mode.

14. The apparatus according to claim 10, wherein the navigation trolley is configured to stop moving when the navigation trolley moves in the checking mode and the depth sensor senses that a drop in a depth direction is greater than a drop threshold, and the liftable checking module is configured to move up and down to check on the goods pile.

15. A backend apparatus configured to receive a checking result for an article pile sent from a checking apparatus, the checking apparatus comprising:

a navigation trolley, wherein the navigation trolley comprises a processing device; and a liftable checking module, wherein the liftable checking module is arranged on the navigation trolley, the liftable checking module is configured to move under control of the navigation trolley so as to obtain, through the movement, depth information of an article pile to be checked, and the processing device is configured to determine side length information of the article pile based on the depth information, determine a checking result for the article pile based on the side length information, and send the checking result to the backend apparatus;

the checking apparatus is further configured to receive an operation mode switching instruction sent from the backend apparatus through the navigation trolley, and switch an operation mode according to the switching instruction, and wherein the switching instruction comprises an instruction to switch from a checking mode to a loading mode or an instruction to switch from a loading mode to a checking mode, and display the checking result through a display screen.

16. The backend apparatus according to claim 15, wherein the backend apparatus is further configured to receive an operation mode switching instruction triggered by a user, and send the switching instruction to the checking apparatus, so that the checking apparatus can switch an operation mode.

17. A checking method, comprising:

moving a liftable checking module under control of a navigation trolley, and obtaining, through the movement, depth information of an article pile to be checked;

determining, by a processing device of the navigation trolley, length information of each side of the article pile based on the depth information, determining a checking result for the article pile based on the length information of each side, and sending the checking result to a backend apparatus; and receiving by the navigation trolley, an operation mode switching instruction sent from the backend apparatus, and switching an operation mode according to the switching instruction, and wherein the switching instruction comprises an instruction to switch from a checking mode to a loading mode or an instruction to switch from a loading mode to a checking mode.

18. A checking management method, comprising:

moving a checking apparatus with a liftable checking module under control of a navigation trolley, and obtaining, by the checking apparatus and through the movement, depth information of an article pile to be checked;

determining, by the checking apparatus, length information of each side of the article pile based on the depth information through a processing device of the navigation trolley, determining a checking result for the article pile based on the length information of each side, and sending the checking result to a backend apparatus;

receiving, by the backend apparatus, the checking result for the article pile sent from the checking apparatus, and displaying the checking result through a display screen; and receiving by the checking apparatus an operation mode switching instruction sent from the backend apparatus, and switching an operation mode according to the switching instruction, and wherein the switching instruction comprises an instruction to switch from a checking mode to a loading mode or an instruction to switch from a loading mode to a checking mode.

* * * * *